May 11, 1937.  E. H. WORTHINGTON  2,079,979
LAWN MOWER
Original Filed Dec. 20, 1933    2 Sheets-Sheet 1
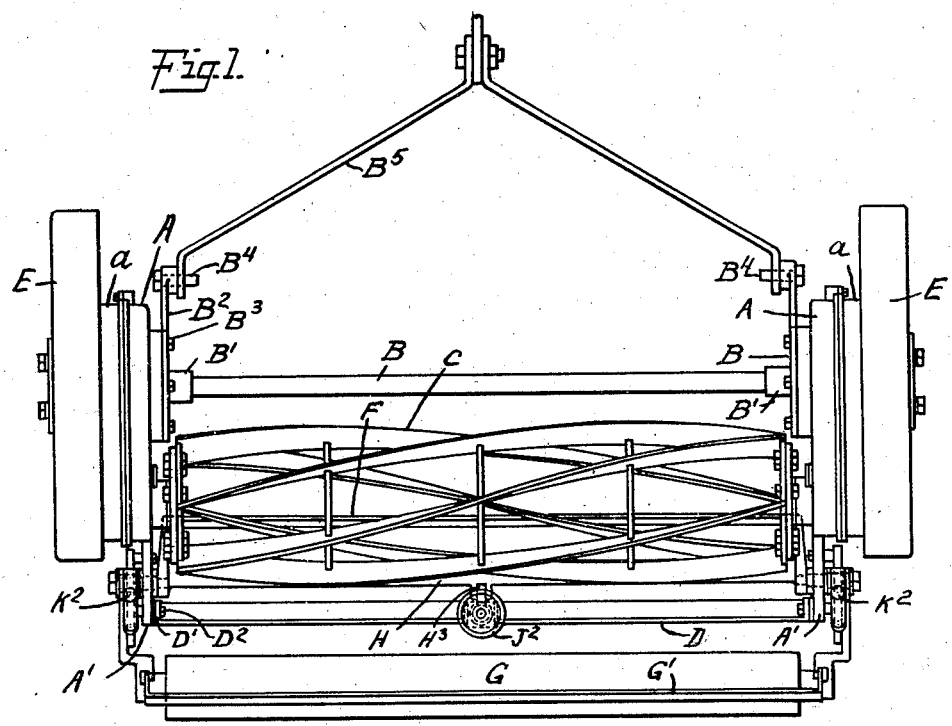
Fig. 1.
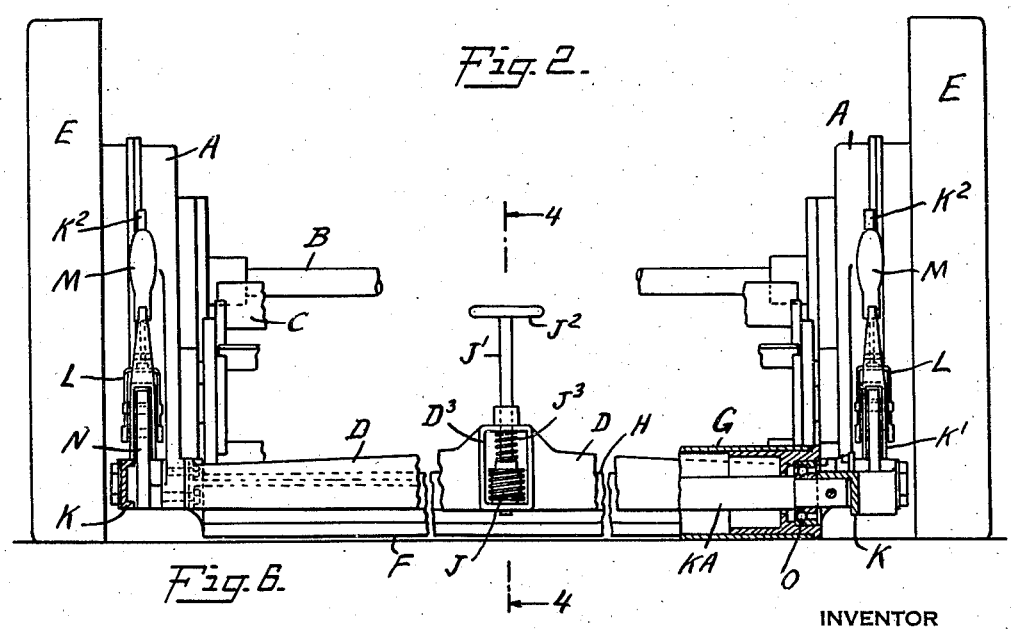
Fig. 2.
Fig. 6.
INVENTOR
Edward H. Worthington
BY
J. E. Hubbell
ATTORNEY May 11, 1937.  E. H. WORTHINGTON  2,079,979
LAWN MOWER
Original Filed Dec. 20, 1933   2 Sheets-Sheet 2
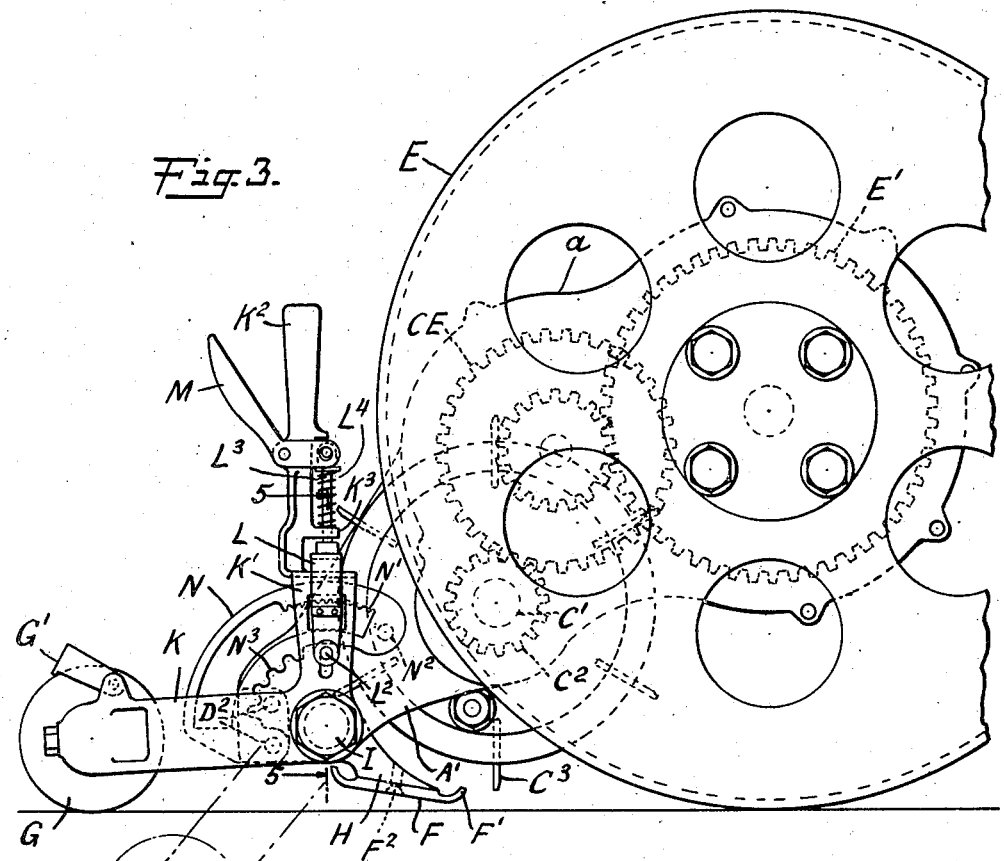
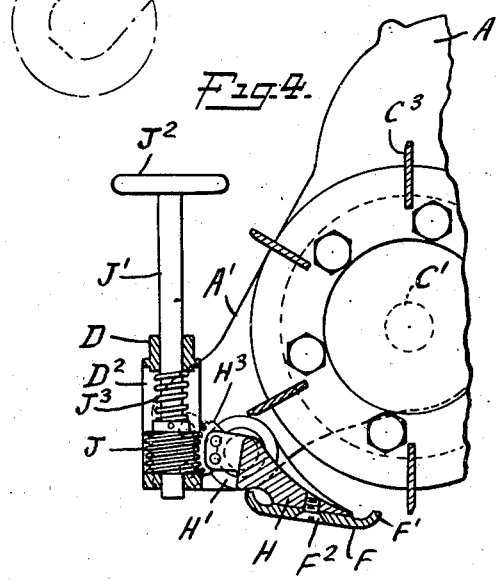
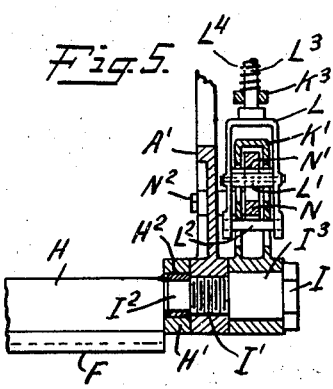
INVENTOR
Edward H. Worthington
BY
J. E. Hubbell
ATTORNEY Patented May 11, 1937

2,079,979

UNITED STATES PATENT OFFICE 2,079,979

LAWN MOWER

Edward H. Worthington, Dunfield, N. J.

Application December 20, 1933, Serial No. 703,170
Renewed July 10, 1936

10 Claims. (Cl. 56—294)

The present invention relates to lawn mowers of the well known type comprising a fly knife and a cooperating nonrotatable bed knife, and a general object of the present invention is to provide such a lawn mower with improved means for supporting and adjusting the bed knife.

A more specific object of the present invention is to provide improved means for moving the bed knife cutting edge relative to the cylindrical path of movement of the cutting edges of the fly knife blades. Proper adjustment of the lawn mower requires that each fly knife blade should engage all along the length of the bed knife during each fly knife rotation. Such engagement is in effect a rough grinding operation which results in wear and necessitates periodical corrective grinding operations performed in a suitable grinding machine. Compensation for the wear of operation requires frequently repeated small bodily movements of the bed knife cutting edge toward the path of the fly knife cutting edges, and larger adjustments are required from time to time in adjusting the lawn mower for operation following grinding or repair operations.

Heretofore it has been customary to provide an adjustable connection between the bed knife at each end of the latter and the adjacent side frame of the lawn mower so that each end of the bed knife may be independently adjusted. Such method of adjustment is open to the practical objection that with it uniform adjustments of the two ends of the bed knife are difficult to effect. In general, that method requires that one end of the bed knife be adjusted before the other end is adjusted, and it is frequently found that after an apparently suitable adjustment has been made at one end of the bed knife, the subsequently made adjustment at the other end of the bed knife makes necessary a readjustment at the end first adjusted. This difficulty is aggravated when, as is usual with lawn mowers as heretofore constructed, the lawn mower framework is not sufficiently rigid to prevent appreciable relative movements of the two side frame members of the framework.

The present invention is characterized primarily by the use of a single manually operable adjustment device acting between the framework and the bed knife, or more accurately the bed knife backing and supporting member, approximately midway between the side frames of the lawn mower. The invention is further characterized by the simplicity and effectiveness of the adjustment device which does not require the use of a wrench or other supplemental tool or implement in effecting bed knife adjustments, and by provisions made giving greater rigidity to the lawn mower frame than has been customary.

In the preferred form of embodiment of the invention hereinafter described in detail, the bed knife backing or supporting member is pivotally connected at its ends to the respective side frame portions of a lawn mower framework and the adjustment device comprises a worm mounted in a cross frame or tie member of the lawn mower framework and is in operative engagement with a worm gear wheel or segment carried by the bed knife bushing member and coaxial with the pivotal connections between the latter and side frame portions of the lawn mower framework. Preferably associated with the adjusting provisions described are resilient means which normally act to frictionally hold the worm against movement of any kind but yields and thereby serves as a relief device minimizing injury as a result of the engagement of a nail or the like between the bed and fly knives.

My invention also comprises improved means for adjusting the bed knife, and fly knife as well, toward and away from the ground level to thereby vary the height of cut. This feature of the invention is characterized not only by the simple and easy manner by which fine adjustments may be effected in the height of the cut when the lawn mower is used, for example, on the fairways and greens of a golf course, but also in effecting the much greater range of adjustment in height of cut required in adapting the lawn mower to use in cutting the "rough" portions of the golf course.

The various features of novelty which characterize my invention are pointed out with particularity in the claims annexed to and forming a part of this specification. For a better understanding of the invention, however, its advantages and specific objects obtained with it, reference should be had to the accompanying drawings and descriptive matter in which I have illustrated and described a preferred embodiment of the invention.

Of the drawings:

Fig. 1 is a plan view of a lawn mower;

Fig. 2 is a rear end elevation of the lawn mower shown in Fig. 1, on a somewhat larger scale, and with parts broken away and in section;

Fig. 3 is an elevation at right angles to Fig. 2;

Fig. 4 is a partial section on the line 4—4 of Fig. 2;

Fig. 5 is a partial section on the line 5—5 of Fig. 3; and

Fig. 6 is a perspective view of a portion of a cross frame member.

In the drawings I have illustrated the use of the invention in a so called high wheel lawn mower which in many respects is like lawn mowers of a general type now in extensive use. The framework of the lawn mower comprises side frame members which serve as gear housings and each of which comprises a gear case member A and a gear case cover $a$ bolted thereto. The side frame members are connected by a main tie member B in front of a fly knife C, and by a second tie member D at the rear of the fly knife. The two driving wheels E of the lawn mower are located at opposite sides of the frame work and are journalled in the corresponding side frame members. In accordance with customary practice they are coaxial with the tie bar B which in the form shown is rigidly secured at its ends to end members B' including transverse flange portions $B^2$ detachably secured by bolts $B^3$ to the adjacent gear case member A.

The cross frame member D is formed at its end with transverse extensions $D^1$ which bear against extensions A' of the side frame members at the rear of the gear housing portions of the latter, and are secured to said extensions by bolts $D^2$, so that the member D may effectually resist the tendency of the side frame members under the shocks and stresses of operation to move relatively to one another about the common axis of the wheels E and cross frame member B.

The fly knife C has trunnion shaft extensions C' at its ends which extend into the corresponding gear housings and within the latter carry pinions $C^2$. Each of the latter forms part of a train of gears through which rotative movement of the adjacent driving wheel E tends to rotate the fly knife. Each train of gears comprises in addition to the pinion $C^2$, a gear E' secured to the corresponding driving wheel E and an intermediate element CE including a pinion in mesh with the gear E' and rigidly connected to an intermediate gear in mesh with the pinion $C^2$. In front of the cross frame member D and cooperating with the fly knife C is a non-rotatable bed knife F and at the rear of the lawn mower there is a ground roll G provided with the usual scraper G'. As shown the flange portions $B^2$ support pintles $B^4$ for the attachment of traction means such as draft rigging part $B^5$ which as shown is of a form suitable for connecting the mower to a tractor employed to draw the mower, or a gang of such mowers, over the ground.

The bed knife F as shown is of the conventional reversible type having uprising side edges F' either of which may occupy the position of the right hand edge F", as seen in Fig. 3, in which it cooperates with the fly knife blades $C^3$ in the cutting operation. In either of its reversible positions the bed knife F is detachably secured by screws $F^2$ to a bed knife backing or supporting member H. The bed knife backing member H is in the form of a bar journalled at its ends in the gear case extensions A' to turn about an axis substantially to the rear of the bed knife edge F" then serving as the cutting edge. In the preferred construction shown, the pivotal connection between each end of the member H and the adjacent side frame member comprises a shaft or pivot pin I which comprises an intermediate threaded portion I' screwed into a threaded aperture in a suitably thickened portion of the corresponding side frame extension A'. The cylindrical inner end $I^2$ of each member forms a pivot which extends through an apertured ear H' formed on the corresponding end of the bed knife member H. Advantageously the aperture in each ear H' is lined with a bushing $H^2$ snugly but removably mounted in the aperture. By rotating the bed knife backing member H about the common axis of the pivot pins I, the bed knife cutting edge F" may be moved toward and away from the cylindrical path of movement of the cutting edges of the fly knife blades $C^3$, as will be readily apparent from Fig. 3.

The means provided in accordance with the present invention for angularly adjusting the bed knife backing member about the axis of the pivot pins I comprise a worm gear segment $H^3$ coaxial with said axis and rigidly secured to the backing member H midway between its ends and a worm J in mesh with the segment $H^3$ and carried by an uprising worm shaft J' having a hand wheel $J^2$ at its upper end and mounted in the cross frame member D. The latter, as shown, is formed with a central enlargement provided with a transverse opening $D^3$ therein which receives the worm J and a spring $J^3$ surrounding the shaft J' and acting between the upper end of the worm J and the upper wall of the opening $D^3$. The shaft J' extends through and is journalled in the upper wall of the opening $D^3$, and the lower end of the shaft J' is journalled in an aperture formed in the lower wall of the opening $D^3$.

With the described arrangement, the rotation of the shaft J' in one direction or the other serves through the worm J and gear $H^2$ to turn the cutting edge F" toward and away from the cylindrical path of the cutting edges of the fly knife blades $C^3$. While the rotation of the shaft J' is effective to turn the worm gear $H^3$, the gear $H^3$ and worm J form a self locking gear connection tending to prevent the worm J from being rotated by the gear wheel $H^3$. Any such rotation as a result of vibrational impulses is substantially prevented with the arrangement shown, by the action of the spring $J^3$ which normally holds the lower end of the worm J in snug frictional engagement with the bottom wall of the opening $D^3$. In addition to the function just mentioned, the spring $J^3$ serves as a relief device minimizing risk of serious injury when a nail or like obstruction passes between the cutting edge of the bed knife and the cutting edge of one of the fly knife blades. While engagement with any such non-severable obstruction may interrupt the rotation of the fly knife and driving wheels, the resultant movement of the bed knife cutting edge away from the fly knife against the tension of the spring $J^3$ reduces the shock and risk of serious damages to the lawn mower on such engagement.

The described means for adjusting the bed knife about the common axis of the pivot pins I are simple and effective and may be readily actuated manually through the hand wheel $J^2$, and without the use of a wrench or other special tool, to effect adjustments as fine and as frequent as might be required. The described adjustment means are inherently well adapted also to effect similar movements of all points along the length of the bed knife cutting edge relative to the fly knife. The location of the adjusting device midway between the ends of the bed knife is convenient from the construction standpoint and from the adjustment operation standpoint, and makes the maximum leverage with which an obstruction between the bed knife and the fly knife can act on the adjustment device a function of half the length of the bed knife.

The removal of the pivot pins I disconnects the bed knife backing member from the lawn mower framework and thereby facilitates the removal of the bed knife whenever necessary or desirable, as for bed knife grinding operations or for the replacement of the bushings $H^2$.

In the preferred construction illustrated, the pivot pins I each comprises a cylindrical pivot pin portion $I^3$ between its enlarged outer head and intermediate threaded portion $I'$. The pivot pin portions $I^3$ form the journals for a yoke frame supporting the ground roll G. Said frame as shown comprises leg portions K each pivoted on the corresponding pivot pin portion $I^3$ and each rigidly secured at its rear end to a shaft KA which forms the base member of the yoke frame. The shaft KA extends axially through, and adjacent its ends supports roller bearings O for the roll G which is hollow.

As will be apparent, the oscillation of the ground roll supporting yoke frame about the common axis of the pivot pins I in one direction or the other raises or lowers the cutting edge $F'$ of the bed knife F, and also the fly knife, relative to the ground level and thus regulates the height of cut. The provisions illustrated for so adjusting the yoke frame include an arm portion $K'$ of each member K extending upward above the corresponding pivot pin I and terminating at its upper end in a lever handle $K^2$, each member K being in effect a bell crank lever. Mounted on each lever arm $K'$ is a latch member L and a latch member M.

As shown, each latch member L is in the form of an inverted U and has secured between its legs, and intermediate the ends of the latter, a detent member $L'$ in the form of a gear segment having a plurality of spur gear teeth adapted to interlock with the teeth $N'$ of a corresponding quadrant member N. Each member N is secured to the adjacent side frame portion $A'$ by means of one of the bolts $D^2$ and another bolt $N^2$, and has its upper portion extending between the legs of the corresponding latch member L. Each quadrant member N is formed with an arc shaped slot and the teeth $N'$ extend along a portion of the upper wall of the slot, said upper wall forming in effect an internal gear segment coaxial with the pivot pins I. A curved bottom portion of each member N forms in effect an internal gear segment coaxial with the pivot pins I, the teeth $N^3$ of which are adapted to coact with a second detent member $L^2$ carried by the corresponding latch member L. As shown each detent member $L^2$ is in the form of a bar extending between and secured to the lower ends of the legs of the corresponding latch member L. Secured to and extending upward from the base portion of each yoke shaped latch member L is a plunger or stem $L^3$ longitudinally movable through an apertured ear $K^3$ formed for the purpose on the corresponding member K, and connected at its upper end to the latch lever M. A spring $L^4$ surrounds each latch member extension $L^3$ and acts between the corresponding lever M and ear $K^3$ in the direction to hold the detent $L^1$ in mesh with the teeth $N^1$ or to hold the detent $L^2$ in the notch between an adjacent pair of teeth $N^3$.

The teeth $N^3$ are angularly displaced relative to the teeth $N'$ so that each detent $L'$ may engage the teeth $N^1$ when the lawn mower is adjusted to cut close to the ground as in mowing greens and fairways, while when a higher cut is desired as in trimming the "rough", each detent $L^2$ may enter one or another of the notches between an adjacent pair of teeth $N^3$. Since in cutting close to the ground a finer regulation of the height of cut is required than when cutting at a greater height above the ground, the pitch of the teeth $N^1$ is ordinarily finer than that of the teeth $N^3$.

As will be apparent, the described means for varying the height of cut are easily operated without the use of any special tool. With the usual cutter length of 30 inches or so, the operator may readily grasp the two lever handles $K^2$ one in each hand, and thereby easily and accurately adjust the lawn mower as required for the desired height of cut. The ease with which the adjustment is permitted is especially important in mowing golf courses where it is frequently desirable to move the mower first over a green or fairway portion of the course and then over a "rough" portion of the course, or vice versa, and to properly trim each portion of the course over which the lawn mower is moved. With prior constructions, the difficulty in adjusting the height of cut has frequently led the user to move the lawn mower, when adjusted for one general height of cut, between portions of the course where such height of cut is suitable over intermediate portions requiring a different height of cut without mowing the last mentioned portions, with a resultant waste of time and energy for which there is no incentive with the ease of adjustment for different heights made possible by the present invention.

The means employed for connecting the ground roll G to the lawn mower framework are especially advantageous, in that regardless of the height of cut adjustment, the shock of engagement of the trailing ground roll with any projection above the general ground surface is transmitted to the framework mainly in the form of a pull exerted on the pivot pins I by the leg members K of the supporting yoke for the ground roll, and the framework is well adapted to resist such a pull. While such a shock may subject the ground roll to a tendency to turn about the axes of the pivot pins I, the resultant stress impressed on the lawn mower framework through the latch members L and the quadrant members N is relatively small.

With the arrangement shown, the provisions adjacent the sides frames for adjusting the height of cut and the provisions located midway between the side frames for adjusting the cutting edge of the bed knife relative to the fly knife do not interfere with one another either structurally or operatively, and each adjustment may be made with comparative ease and rapidity and with the required accuracy. The rigidity of the lawn mower framework due to the use of the cross frame member D contributes to the practical effectiveness of the simple adjustment provisions described. As will be apparent, the shape and disposition of the cross frame member D may readily be made such as to give adequate stiffness to the framework without adding objectionably to the weight, bulk or cost of the latter. This is particularly true because of the substantial extent of bearing surface which may be provided between each integral end portion $D'$ of the member D and the adjacent side frame portion $A'$. As shown the member D is in effect a flanged beam with longitudinally stiffening web or flange extending transversely to the main web or flange portion of the beam. The end surfaces of the beam which are secured to the adjacent side frame members by the bolts D² are formed by web or flange portions transverse and integrally connected to the two previously mentioned main longitudinal webs or flanges of the member D. As appears from Fig. 3, the two bolts D² by which each end of the member D is secured to the corresponding frame portion A¹ are spaced apart from one another in the general direction required to best resist the tendency of the side frames A¹ to move relative to one another about the axis of the front cross frame member B. Such relative movement is that to which there is the greatest tendency as a result of the movement of the lawn mower over ground inequalities whereby all of the contact pressure between the ground and ground roll G may be momentarily concentrated at one end or the other of the latter.

While in accordance with the provisions of the statutes I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a lawn mower, the combination with a framework comprising side frame members and a cross frame member, of a fly knife journalled at its ends in said side frame members, a cooperating bed knife member pivotally connected at its ends to said side frame members, a worm mounted in said cross frame member to turn about an axis transverse to the length of the latter, and a worm gear part coaxial with the pivotal connections of said side frame members and bed knife member and carried by the latter and in mesh with said worm.

2. In a lawn mower, the combination with a framework comprising side frame members and a cross frame member, of a fly knife journalled at its ends in said side frame members, a cooperating bed knife member pivotally connected at its ends to said side frame members, a worm mounted in said cross frame member to turn about an axis transverse to the length of the latter, a worm gear part coaxial with the pivotal connections of said side frame members and bed knife member and carried by the latter and in mesh with said worm, and yielding means permitting movement of said worm in the direction of its axis on the engagement of an obstruction between the bed and fly knives.

3. In a lawn mower, the combination with a framework comprising side frame members and a cross frame member, of a fly knife journalled in said side frame members, a cooperating bed knife member, pivotal connections between the ends of the latter and said side frame members, a worm gear part secured to said bed knife approximately midway between the ends of the latter and coaxial with said pivotal connections, and a worm mounted in said cross frame member to turn about an axis transverse to the axis of said pivotal connections and longitudinally movable in the direction of said axis relative to said cross frame member, and a spring acting between said cross frame member and worm and normally holding said bed knife member against movement relative to said fly knife but yielding to permit such movement under stress due to engagement of an obstruction between the fly knife and bed knife.

4. In a lawn mower, the combination with a framework, comprising side frame members and a cross frame member, the latter having a worm engaging surface, of a fly knife journalled in said side frame members, a cooperating bed knife member, pivotal connections between the ends of the latter and said side frame members, a worm gear part secured to said bed knife approximately midway between the ends of the latter and coaxial with said pivotal connections, and a worm mounted in said cross frame member to turn about an axis transverse to the axis of said pivotal connections and longitudinally movable in the direction of its axis relative to said cross frame member, toward and away from a position in which said worm engages said surface, and a spring acting between said cross frame member and worm and normally holding the latter in said position but yielding to permit said worm to move away from said position under stress due to engagement of an obstruction between the fly knife and bed knife.

5. In a lawn mower, the combination with a framework, driving wheels, a fly knife and a bed knife mounted in said framework a ground roll and means for adjustably connecting said ground roll to said framework comprising a pair of lever members at opposite sides of and pivotally connected to said framework and to said ground roll each of said levers having a portion extending upwardly from its pivotal connection to said framework, a latch member and a cooperating latch lever mounted on each said portion, and latch engaging means secured to said framework and comprising a set of teeth of relatively fine pitch for engagement by each latch member in adjusting the mower for a relatively close cut and a second set of teeth cooperating with each latch member to adjust the mower for a relatively high cut.

6. In a lawn mower, the combination with a framework, driving wheels, a fly knife and a bed knife mounted in said framework, a yoke shaped ground roll support comprising legs respectively adjacent the sides of and pivotally connected to said framework and a connecting base portion, a hollow ground roll surrounding and journalled on said base portion, each of said legs comprising a portion extending upward from its pivotal connection to said framework, a U shaped latch member mounted on each of said leg portions for movement relative thereto toward and away from the pivotal connection of the leg to said framework, said latch member comprising spaced apart portions extending radially from the corresponding pivotal connection and transverse connecting portions at different distances from the axis of said pivotal connection, and means mounted on said framework for cooperation with each latch member comprising a part extending between the spaced apart portions of the latch member and formed with two sets of internal gear teeth, teeth of one set being adapted for engagement by one of said transverse portions in adjustment of the mower for a relatively low cut and teeth of the other set being adapted for engagement by the other of said transverse portions in adjustment of the mower for a relatively high cut.

7. In a lawn mower, the combination with a framework comprising rigidly connected side frame members, driving wheels and a fly knife journalled in said side frame members, each of said side frame members having a rear extension and an aperture therein, a pivot pin member extending through and anchored in each of said apertures, a bed knife backing member having bearings at its ends receiving portions of said pivot pins at the inner sides of said extensions, a yoke shaped ground roll support having legs respectively adjacent the outer sides of said extensions and formed with bearings receiving portions of said pins at the outer sides of said extensions, and a hollow ground roll surrounding and journalled on the base portion of said support.

8. In a lawn mower, the combination with a framework comprising side frame members having rear extensions and means including a cross frame member extending between said extensions for rigidly connecting said side frame members, driving wheels and a fly knife journalled in said side frame members, each of said side frame members having an aperture therein, a pivot pin member extending through and having an intermediate portion anchored in each of said apertures, a bed knife backing member having bearings at its ends receiving the portions of said pivot pins at the inner sides of said extensions, a yoke shaped ground roll support having legs respectively adjacent the outer sides of said extensions and formed with bearings receiving the portions of said pins at the outer sides of said extensions, a hollow ground roll surrounding and journalled on the base portion of said support, means acting between each of said legs and the adjacent extension for securing said support to said framework in different relative angular adjustments about said pivot pins to thereby vary the height of cut, and means acting between a portion of said bed knife member intermediate its ends and said cross frame member for adjusting said bed plate member relative to said fly knife.

9. In a lawn mower, the combination with a framework comprising side frame members and a cross frame member, of a fly knife journalled in said side frame members, a bed knife journalled in said side frame members for movements about an axis toward and away from the fly knife, and an adjusting and relief connection between said bed knife and cross frame member comprising a shaft extending transversely to, and laterally displaced from said axis and mounted in said cross frame member for rotative and for longitudinal sliding movements, means through which the rotative movements of said shaft give adjusting movements about said axis to the bed knife, means positively preventing a longitudinal sliding movement of said shaft which permits the bed knife to turn toward the fly knife out of a position into which the bed knife has been adjusted by a previous rotative movement of said shaft, and means resiliently opposing a longitudinal sliding movement of said shaft which permits the bed knife to turn away from the fly knife out of said position.

10. In a lawn mower, the combination with a framework comprising side frame members and a cross frame member, of a fly knife journalled in said side frame members, a bed knife element, a pivotal connection between said element and said side frame members, and means for adjusting said element about the axis of said pivotal connection comprising cooperating gear members one of which is mounted on said cross frame member and one of which is mounted on said element.

EDWARD H. WORTHINGTON.